United States Patent [19]

Del Monte et al.

[11] Patent Number: 4,741,024

[45] Date of Patent: Apr. 26, 1988

[54] SELECTIVE RINGING CIRCUIT FOR A TELEPHONE

[76] Inventors: Philip J. Del Monte, 0701 County Rd. 143 A; Jackie L. Vanwey, 0683 County Road 103, both of Florence, Colo. 81226

[21] Appl. No.: 760,864

[22] Filed: Jul. 30, 1985

[51] Int. Cl.$^4$ .......................................... H04M 13/00
[52] U.S. Cl. .................................... 379/181; 379/183
[58] Field of Search ................. 179/17 R, 17 A, 17 E, 179/84 SS, 84 A, 86, 84 R; 379/118, 127, 183, 179, 180, 181, 252, 253, 418

[56] References Cited

U.S. PATENT DOCUMENTS

| | | | |
|---|---|---|---|
| 1,778,768 | 9/1930 | Norton | 179/86 |
| 3,230,316 | 1/1966 | Hunt | 179/84 |
| 3,916,111 | 10/1975 | Ott | 379/180 |
| 4,001,512 | 1/1977 | Proctor et al. | 379/183 |
| 4,310,723 | 1/1982 | Svala | 379/180 |
| 4,587,380 | 5/1986 | Curtin | 379/181 |
| 4,669,112 | 5/1987 | Ahuja | 379/183 |
| 4,701,949 | 10/1987 | Lynch et al. | 379/180 |

FOREIGN PATENT DOCUMENTS

35503 3/1977 Japan ................................ 179/17 E

*Primary Examiner*—Stewart J. Levy
*Assistant Examiner*—Lawrence G. Fess
*Attorney, Agent, or Firm*—John R. Ley

[57] ABSTRACT

A selective ringing circuit for a telephone line includes a rectifier which is normally connected to the telephone line for rectifying the AC ringing and other signals. The rectified ringing signals will not activate the ringing circuit of the telephone equipment, because a capacitor in the ringing circuit is charged and will not pass current therethrough in response to the DC signal. The selective ringing circuit includes a switch-selective signal-detecting arrangement by which a predetermined one of the ringing signals is detected and is used as an activation signal, while the other ringing signals are rejected. The activation signal activates an electrical connecting device which, when activated, electrically bypasses the rectifier and directly electrically connects the predetermined selected ringing signal to the telephone equipment. An automatic number identification circuit includes a transistor switch which connects a predetermined ground resistance to the telephone line. A shunt resistance automatically shunts a tip or ring dropping resistor to compensate for the unbalanced resistive effects of a biasing circuit for the transistor switch. The rectifier supplies consistent polarity DC signals to the telephone equipment.

27 Claims, 2 Drawing Sheets

Fig_1

NEGATIVE RING OR TIP
RINGING SIGNAL

Fig_2 PRIOR ART

POSITIVE RING OR TIP
RINGING SIGNAL

Fig_3 PRIOR ART

Fig-4

SELECTIVE RINGING CIRCUIT FOR A TELEPHONE

This invention pertains to a new and improved selective ringing circuit for use in reliably distinguishing among different ringing signals on a telephone party line, for ringing the telephone set or other equipment only upon receipt of a selected predetermined ringing signal while preventing ringing in response to other different ringing signals, and for maintaining a predetermined signal polarity to sensitive telephone equipment such as computer communication equipment.

BACKGROUND OF THE INVENTION

Before the telephone companies relinquished complete control over the whole telephone system, including the telephone lines and the telephone equipment connected to the lines, few significant problems were experienced by telephone subscribers on telephone party lines. The telephone sets supplied by the telephone company were specifically adapted or "wired" to respond only to a single one of the four possible ringing signals which the telephone company might apply to the telephone party line to ring or address a specific subscriber. The four different ringing signals are a positive ringing signal on the tip conductor, a negative ringing signal on the tip conductor, a positive ringing signal on the ring conductor and a negative ringing signal on the ring conductor. So long as the telephone company was able to specifically adapt each telephone set to respond to only one of these ringing signals, reliable ringing operation was possible.

Significant ringing problems on party lines began arising when different types of telephone sets and equipment became available from manufacturers and sources other than the telephone company. Most of the commercially available telephone equipment responds to any type of ringing signal because the equipment is manufactured to be used on private telephone lines and not party lines. Such equipment cannot readily be used on party lines without modification, and consumers are unable, or do not have sufficient information, to make the appropriate modifications.

To attempt to solve the problem of adapting varieties of different telephone equipment to party line operation, selective ringing circuits have been devised. The typical selective ringing circuit is a separate piece of equipment which is electrically connected between the party line and the telephone equipment, either in a telephone company central office or at the point of use of the telephone equipment. The typical selective ringing circuit is subject to certain disadvantages. One significant disadvantage is that a different selective ringing circuit is required to obtain the desired response from each of the four party line ringing signals. A substantial inventory of each of the four different types of selective ringing circuits must be kept available. Furthermore, many of the selective ringing circuits are not as effective or precise in operation as is desired. Problems have been encountered in responding to the correct or selected ringing signal and in rejecting the other undesired ringing signals. Some of these problems occur as a result of peculiarities in the telephone systems and lines from one geographical area to the other. Many of the currently available selective ringing circuits will not respond properly to different strengths and levels of signals, to switching signals, and to other peculiarities, all of which pose problems of reliability in operation. Other currently available selective ringing circuits modify the normal telephone signals to the point where the signals are incapable of producing an adequate response in the telephone equipment, even if the selective ringing circuit achieves adequate signal recognition and rejection.

In two party-party line operation, it is common practice for the telephone company to identify the second party for long distance billing purposes by placing a predetermined ground resistance, nominally 2600 ohms, on the line when the second party places a long distance call. The second party is identified by the added resistance effects on the line. Commonly available telephone equipment does not include the capability for selectively switching the predetermined ground resistance into the line for automatic party or number identification purposes.

Most modern telephone equipment, including that supplied by the telephone company, lacks the capability to achieve communication with computers and comparable devices, without modification. Most communication with computers is achieved through tone-generating key pads which generate AC signals representative of the keys depressed. Such key pads require a constant DC voltage to operate. Since it is typical practice for the telephone company to reverse the polarity of the telephone line of a calling party when the called party answers, this has the effect of disabling the key pad of the calling party and rendering it useless for communication under such circumstances. With special modifications to the telephone set, the problem of a disabled key pad can be overcome, but again, such modifications are not within the capability of a consumer of conventional telephone equipment.

GENERAL SUMMARY OF THE INVENTION

It is the general objective of the present invention to provide a new and improved selective ringing circuit for a telephone line which allows standard telephone equipment to be used without modification in all party line situations, in two party automatic number identification situations, in selective ringing situations whether on party lines or on private lines, and in situations where a consistent polarity signal must be supplied to the telephone equipment to achieve proper operation. Another objective is to achieve the foregoing without adversely influencing the normal functioning or operation of all known telephone systems and equipment.

The selective ringing circuit of the present invention includes rectifier means connected to the tip and ring conductors of a telephone party line for rectifying each of the plurality of AC ringing signals applied to the line. The rectifier means rectifies the AC ringing signals to a DC signal and supplies the DC signal to the telephone equipment. The ringing circuit of the telephone equipment will not respond to the DC signal because a capacitor in the ringing circuit charges and prevents current conduction. The selective ringing circuit also includes connection means for selectively electrically bypassing the rectifier means when activated to directly connect the AC ringing signal to the telephone equipment. A ringing signal detector means is electrically connected to the telephone lines and is selectively responsive only to a predetermined selected ringing signal to operatively activate the connection means to bypass the rectifier means upon receipt of the predetermined ringing signal. Switches are preferably electrically connected to each of the tip and ring conductors, and poled conductive devices including diodes and Zener diodes are connected to the switches. Closure of one of the switches selects the predetermined ringing signal to which the ringing signal detector means responds. Any one or more of the different predetermined ringing signals can be selected by closing a specific switch, and the other ringing signals will be rejected. The selective ringing circuit of the present invention will therefore function to reliably respond selectively to any of the different ringing signals. The direct electrical connection of the telephone lines to the telephone equipment when the particular ringing signal is received allows operation of the telephone system without any adverse influence or effect created by the selective ringing circuit.

During normal telephone communication, the rectifier means is not bypassed and therefore does not influence the normal DC current loop through the telephone equipment. Normal telephone operation is not adversely affected. The rectifier means also creates a consistent predetermined DC polarity to the telephone equipment, thereby achieving the advantageous effects of maintaining key pads energized, allowing communication with computers, and the like, without necessity for modifications to the telephone equipment.

The selective ringing circuit of the present invention includes an automatic number identification means which selectively connects a predetermined ground resistance to the telephone line to automatically identify a particular subscriber for long distance billing purposes. The automatic number identification means includes a voltage sensitive transistor for electrically connecting a tip dropping resistor and a ring dropping resistor to a telephone line for identification purposes. Because the transistor is voltage responsive, the adverse influences from current conduction and the like do not effect its operation. To compensate for the resistance of a biasing circuit for the transistor which is connected to one of the telephone line conductors, depending on the relative polarity of the conductors, a shunt resistance is automatically connected in parallel with the appropriate dropping resistor to balance the ground resistance on both the tip and ring conductors of the telephone line.

The nature and details of the present invention can be more completely understood by reference to the following description of a preferred embodiment and the accompanying drawings, and from the appended claims.

DETAILED DESCRIPTION OF PREFERRED EMBODIMENT

Figure 1:
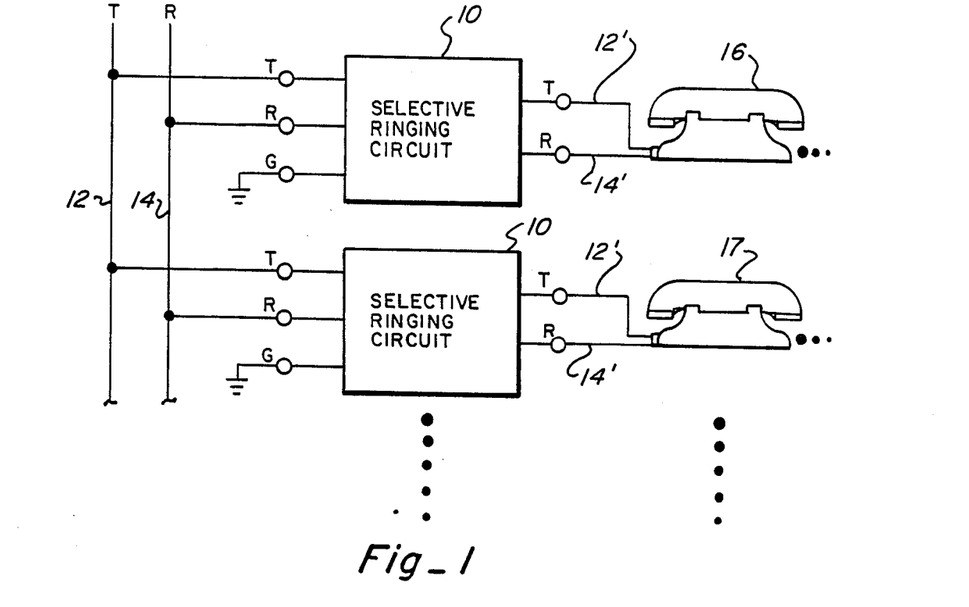
FIG. 1 is a block diagram of the selective ringing circuit of the present invention electrically connected between the conductors of a telephone party line and a telephone set.

The selective ringing circuit of the present invention is referenced 10 in FIG. 1 and is shown electrically connected between a telephone party line and a telephone set. The telephone party line comprises a tip conductor 12 and a ring conductor 14. One party or subscriber on the party line has a telephone set 16, and another different party or subscriber on the party line has a telephone set 17. The subscriber having the telephone set 16 could possess additional telephone sets or additional telephone equipment (not shown) that could be connected in parallel with the telephone set 16 and to the single selective ringing circuit. Alternatively, each separate piece of telephone equipment of the first subscriber could employ its own selective ringing circuit 10 which would be directly connected to the telephone party line. A similar situation could exist for the next telephone subscriber having the telephone set 17. For use of the selective ringing circuit on a private line, the telephone equipment of only one party or subscriber would be connected to the telephone line.

The telephone equipment is electrically connected to the selective ringing circuit 10 by tip and ring extension conductors 12' and 14', respectively. Usually, the selective ringing circuit 10 will be located in the subscriber's home or office, in which case the conductors 12' and 14' are simply part of an extension line. However, the selective ringing circuit 10 could also be located in the telephone company central office, in which case the conductors 12' and 14' are dedicated tip and ring connectors extending from the central office to the party line subscriber's telephone equipment in the subscriber's home or office. Although only two party line subscribers are illustrated in FIG. 1, it should be recognized that each subscriber would have at least one selective ringing circuit 10 connecting that subscriber's telephone equipment to the telephone line conductors 12 and 14.

The selective ringing circuit 10 is responsive in all of the common party line ringing situations: two party divided, four party fully selective, and eight party semiselective. The selective ringing circuit 10 responds only to one ringing signal for ringing the telephone equipment of the subscriber associated with that ringing signal. The other ringing signals associated with other subscribers are rejected, to avoid ringing the telephone equipment by ringing signals addressed to other party line subscribers.

Figure 2:
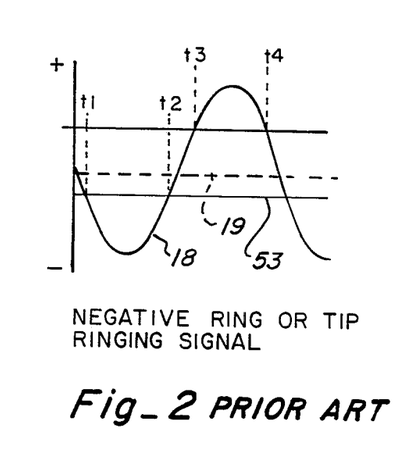
FIG. 2 is a waveform diagram illustrating the typical negative ring ringing signal or negative tip ringing signal applied to the telephone party line conductors.

The four types of ringing signals applied by the telephone company to telephone party lines are a negative ring signal, a negative tip signal, a positive ring signal or a positive tip signal. FIG. 2 illustrates both the negative ring and negative tip ringing signals, which have exactly the same electrical characteristics and are referenced 18. The signal 18 is a sine wave signal which has been offset by a negative bias voltage level indicated at 19, from ground potential. In the case of a negative ring ringing signal, the ringing signal 18 is applied to the ring conductor, while the tip conductor is held at ground potential. In the case of a negative tip ringing signal, the signal 18 is applied to the tip conductor, while the ring conductor is held at ground potential. A similar situation exists with respect to the positive ring and positive tip ringing signals illustrated at 20 in FIG. 3. The ringing signal 20 is a sine wave which has been offset positively with respect to ground potential by a positive bias voltage level indicated at 21. In the case of a positive ring ringing signal, the ringing signal 20 is applied to the ring conductor while the tip conductor is held at ground potential. In the case of a positive tip ringing signal, the ringing signal 20 is applied to the tip conductor while the ring conductor is held at ground potential.

Figure 3:
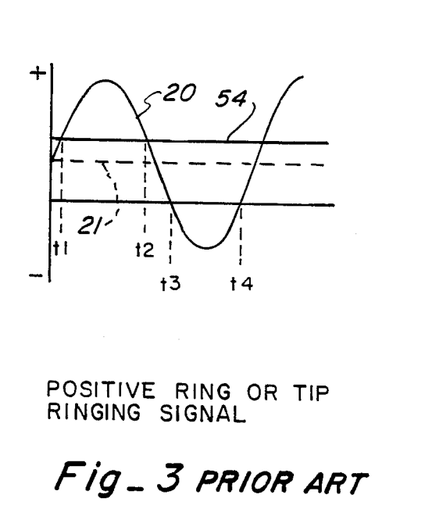
FIG. 3 is a waveform diagram illustrating the typical positive ring ringing signal or positive tip ringing signal applied to the telephone party line conductors.

The four separate ringing signals are distinguishable from other another by the positive or negative bias voltage offset and by the conductor, tip or ring, to which the ringing signal is applied.

An identical selective ringing circuit 10 is used by all of the party line subscribers. Each circuit 10 is capable of responding to a predetermined selected one of the ringing signals to ring the telephone equipment while rendering the telephone equipment incapable of ringing in response to the other, non-selected ringing signals. One selective ringing circuit 10 is shown in greater detail in FIG. 4. The tip and ring conductors 12 and 14, respectively, from the telephone party line are connected to the selective ringing circuit 10 at terminals 12a and 14a. Earth ground potential is connected at terminal 16a. The tip extension conductor 12' and the ring extension conductor 14' extend from the telephone equipment and connect to the selective ringing circuit 10 at terminals 12b and 14b. In actual practice, conventional telephone jack and socket arrangements are used to provide the terminals 12a, 14a and 16a and to provide the terminals 12b and 14b.

Figure 4:
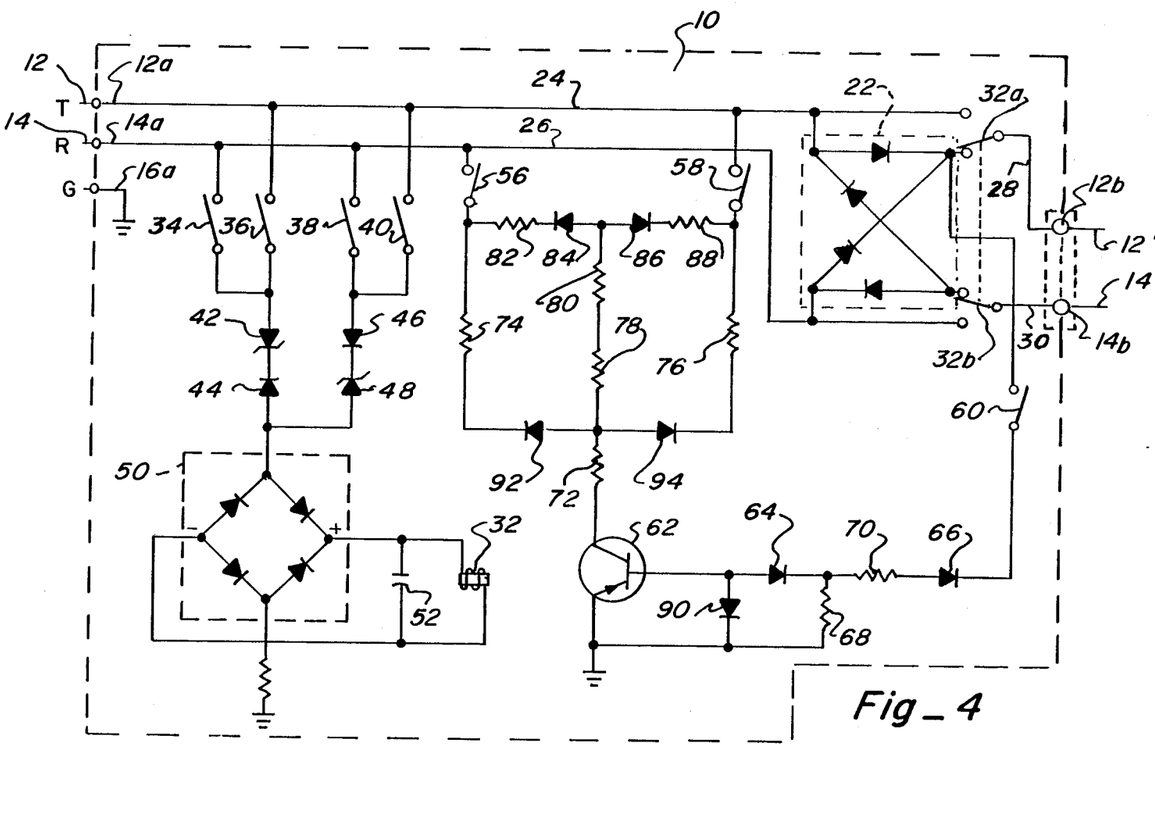
FIG. 4 is a schematic diagram of the selective ringing circuit shown in FIG. 1.

The tip conductor 12 and ring conductor 14 of the telephone party line are electrically connected through the selective ringing circuit 10 to the tip extension conductor 12' and ring extension conductor 14' of the telephone equipment, respectively. In the situation where the subscriber's telephone equipment is not being addressed by the predetermined selected ringing signal and when the telephone equipment is not in use, hereinafter referred to as a "non- or not activated" condition, the electrical connection between the conductors 12 and 12' and the conductors 14 and 14' is through means of a rectifying bridge 22. The effect of the rectifying bridge 22 is to supply a positive DC voltage on the conductor 12' and a negative DC voltage on conductor 14', regardless of the type of ringing signal or polarity of a DC signal which is applied to the tip and ring conductors 12 and 14, respectively.

The DC signal applied at conductors 12' and 14' has the effect of inhibiting the ringing function of the telephone equipment. The ringing circuit in the telephone equipment is a series connection of a capacitor and an inductor or other device which rings a bell or produces an audible signal only when an AC signal is conducted through it. The DC signal charges the capacitor and prevents it from discharging. The charged capacitor inhibits the current flow through the ringing circuit and therefore prevents the telephone equipment from ringing.

In the situation where the subscriber's telephone equipment is being addressed by the predetermined selected ringing signal, hereinafter referred to as an "activated" condition, a direct electrical connection is established between the conductors 12 and 12' and the conductors 14 and 14'. The rectifying bridge 22 is bypassed in the activated condition. Ringing signals are directly connected through the selective ringing circuit 10 without alteration or modification. The direct electrical connection possesses substantial advantages in that it does not adversely affect the normal telephone system operation by, for example, reducing the strength of the ringing signal, or adding additional impedance or resistance to the telephone lines which would affect the ringing signals, as is common with most prior selective ringing circuits.

In the normal telephone use or communication situation, the rectifying bridge 22 is not bypassed but is in the non-activated condition. A DC current flow path exists through the bridge 22 to the telephone equipment. Since a DC current path exists through the telephone equipment when the equipment is in normal use, the bridge does not affect normal operation in the non-activated condition. A consistent polarity DC signal is applied to the telephone equipment by the bridge 22, and this consistent polarity signal has the effect of maintaining key pads and other devices activated for computer communication purposes and the like.

The rectifying bridge 22 is connected between an internal tip conductor 24 and an internal ring conductor 26 within the selective ringing circuit 10. The positive and negative DC voltages from the bridge 22 are applied at conductors 28 and 30, respectively. A first set of relay contacts 32a, which is shown in FIG. 4 in the normal position during a not activiated condition, conducts the positive DC voltage from conductor 28 to the terminal 12b and conductor 12'. Similarly, a second set of relay contacts 32b, which is shown in FIG. 4 in the normal position during a not activated condition, conducts the DC voltage at conductor 30 to the terminal 14b and conductor 14'. The position of the relay contacts 32a and 32b is controlled by a coil 32 of a relay which includes the contacts 32a and 32b and the coil 32. When activated, the relay coil 32 moves the relay contacts 32a and 32b simultaneously to the opposite position from that shown in FIG. 4. In the activated position, the internal tip conductor 24 is directly connected to the terminal 12b and conductor 12', and the internal ring conductor 26 is directly connected to the terminal 14b and conductor 14'. Thus, when activated, the selective ringing circuit 10 directly connects the telephone tip and ring conductors 12 and 14, to the extension tip and ring conductors 12' and 14', respectively.

Unless the selective ringing circuit 10 is activated, it will normally supply a DC voltage and current signal to the telephone equipment connected to conductors 12' and 14'. In response to the application of a predetermined ringing signal on the tip and ring conductors 12 and 14, the coil 32 will operate the relay contacts 32a and 32b to the activated position, and the ringing signal will be directly conducted through the selective ringing circuit to the telephone equipment for ringing the equipment in the normal manner. Normal ringing occurs in response to the sine wave ringing signal, 18 or 20 shown in FIGS. 2 or 3, respectively, because the capacitor in the ringing circuit conducts the AC ringing signal.

To activate only in response to the predetermined selected ringing signal, the selective ringing circuit 10 includes means for detecting the predetermined ringing signal and for rejecting the other ringing signals to provide an activation or a triggering signal for the relay coil 32 controlling the relay contacts 32a and 32b. Signal selection is achieved by use of switches 34, 36, 38 and 40. The series connection of a Zener diode 42 and a conventional diode 44, poled in the manner shown, conducts selected portions of the negative ringing signals (FIG. 2) while blocking entirely positive ringing signals (FIG. 3). The series connection of a conventional diode 46 and a Zener diode 48, poled in the manner shown, conducts selected portions of the positive ringing signals (FIG. 3) while blocking entirely negative ringing signals (FIG. 2). A rectifying bridge circuit 50 receives the selected portions of the signals conducted through either of the poled conductive diode pairs 42 and 44 or 46 and 48, rectifies the signals to a consistent DC polarity, and supplies direct current to the relay coil 32 and a capacitor 52 connected in parallel with the relay coil 32. The direct current supplied by the rectifying bridge 50 becomes the triggering signal to the relay coil 32. The relay contacts 32a and 32b are moved from the normal position shown in FIG. 4 to the activated position when the bridge 50 supplies DC current to the coil 32.

The switches 34, 36, 38 and 40 and the diode pairs 42, 44 and 46, 48 serve as means for selecting the predetermined ring signal which activates the selective ringing circuit and for distinguishing and rejecting ringing signals other than the predetermined selected signal. Switches 34 and 36 and diodes 42 and 44 serve as means for selecting the negative ringing signal on the ring conductor (closure of switch 34) or the tip conductor (closure of switch 36) to activate the selective ringing circuit. Switches 38 and 40 and diodes 46 and 48 serve as means for selecting the positive ringing signal on the ring conductor (closure of switch 38) or on the tip conductor (closure of switch 40) to activate the selective ringing circuit. Closure of switch 34 applies the negative ring signal on the ring conductor 14 across the Zener diode 42. The Zener diode 42 is poled to conduct current therethrough when the negative signal applied at the switches 34 or 36 exceeds its breakdown voltage. The breakdown voltage of the Zener diode 42 is selected to be greater than the absolute value of the negative offset voltage 19 shown in FIG. 2. The breakdown voltage of the Zener diode 42 is illustrated at 53 in FIG. 2. The bridge rectifier 50 commences conducting current when the breakdown voltage of the Zener diode 42 is exceeded, which occurs at time t1 shown in FIG. 2. The Zener diode remains conducting until the ringing signal 18 becomes less (in a negative sense) than the breakdown voltage 53 of the Zener diode, which occurs at time t2. During the time interval between t1 and t2, the bridge rectifier 50 conducts DC current as the triggering signal to charge the capacitor 52 and to energize the relay coil 32. During the time after t2 until the ringing signal 18 once again exceeds (in a negative sense) the Zener breakdown voltage 53, the relay coil 32 conducts current as a result of the discharge current supplied by the capacitor 52. The conventional diode 44 is poled to prevent the rectifier 50 from receiving current through the closed switch 34 during the time period t3 to t4 (FIG. 2) when the ringing signal 18 exceeds zero potential. The discharge time constant of the capacitor 52 and the relay coil 32 is selected to provide sufficient current to the coil 32 to maintain the relay in an activated state between successive times t2 and t1 of successive cycles of the ringing signal 18.

The circuit 10 remains activated so long as the ringing signal 18 is present. The ringing signal 18 is present during a ringing interval, but is absent during a silent interval which follows each ringing interval. The ringing interval and the silent interval create one cycle of the repetitious ring perception experienced by the subscriber during ringing of the telephone equipment. During the silent interval, current from the capacitor 52 discharges sufficiently through the relay coil 32 to cause the relay to release the relay contacts 32a and 32b from the activated position.

Closure of switch 36 causes the selective ringing circuit 10 to respond to a negative ringing signal applied on the tip conductor 12. Closing switch 36 causes the selective ringing circuit 10 to respond in exactly the same manner as has previously been described in conjunction with the closure of switch 34 except that the circuit 10 responds to the negative ringing signal on the tip conductor instead of on the ring conductor.

The selective ringing circuit 10 distinguishes a positive ringing signal applied on the ring conductor 14 as a result of closing the switch 38. The positive ringing signal is illustrated in FIG. 3. Closure of the switch 38 connects the poled conductive diode pair 46 and 48 in series with the rectifying bridge 50 between the ring conductor and ground. The Zener diode 48 is poled to conduct current to the ring conductor upon the positive voltage on the ring conductor exceeding the breakdown voltage of the Zener diode 48. When the positive ringing signal 20 exceeds the breakdown voltage of the Zener diode 48 (referenced at 54 in FIG. 3), the bridge rectifier 50 commences conducting DC current at time period t1, as shown in FIG. 3. The rectifier 50 delivers the DC current as a trigger signal to the relay coil 32 and the capacitor 52, so long as the ringing signal 20 exceeds the Zener breakdown voltage 54 (FIG. 3). At time t2, the ringing signal 20 drops below the Zener breakdown voltage 54 and the triggering DC current from the bridge 50 terminates. The capacitor 52 discharges through the relay coil 32 to hold the relay contacts in the activated position until the positive ringing voltage 20 once again exceeds the Zener breakdown voltage at time t1 in the next cycle of the ringing signal 20. Diode 46 is poled to prevent the bridge 50 from conducting current when the ringing signal 20 drops below zero potential during the time period t3 to t4.

Closure of switch 40 causes the selective ringing circuit 10 to respond to a positive ringing signal applied on the tip conductor 12, in exactly the same manner as has been previously described in conjunction with the closure of switch 38, except that the circuit 10 responds to the positive ringing signal on the tip conductor instead of on the ring conductor.

In accordance with the foregoing description, when one of the switches 34, 36, 38 or 40 is closed and a ringing signal of the selected type is applied to the conductor to which the closed switch is connected, the relay is activated and the relay contacts 32a and 32b move to the activated position. The ringing signal is directly connected to the telephone equipment tip and ring extension conductors 12' and 14'. The telephone equipment rings in response to the selected ringing signal identified and distinguished by the closed one of the switches 34, 36, 38 or 40. Ringing signals other than the selected one are coupled through the rectifier bridge 22 and create a direct current to the telephone equipment tip and ring extension conductors 12' and 14'. The capacitor in the ringing circuit of the telephone equipment charges and blocks any current flow through the ringing circuit. Ringing signals other than the selected one create no ringing effect on the subscriber's telephone equipment.

Fully selective four party operation can thus be achieved with the selective ringing circuit 10. A different predetermined one of the switches 34, 36, 38 or 40 is closed in each of the four subscriber's selective ringing circuits 10. Closure of only one of the switches in each subscriber's selective ringing circuit assures that the ringing signal specifically addressed to that subscriber activates that subscriber's telephone equipment. The telephone equipment of the other subscribers does not ring, except in response to ringing signals specifically addressed and identified with each particular subscriber. Eight party semi-selective operation is achieved in the same manner as four party fully selective operation. However, in accordance with conventional telephone system practice, the telephone equipment of two subscribers on an eight party line will ring simultaneously. The ring for one party is distinguished from the ring for the other party by a characteristic difference in the ringing and silent intervals of the two ring signals. For example, one subscriber's ring signal may be characterized by a relatively long ringing interval followed by a silent interval, while the other subscriber's ring signal is characterized by two relatively short bursts or ringing intervals followed by a relatively long silent interval. Of course, the other six subscribers to the eight party line will not receive these ringing signals because the switches of their selective ringing circuits will not be closed to respond to such ringing signals. Thus, on party lines involving more than four subscribers, the telephone equipment of two of the subscribers will ring simultaneously, but the characteristics of ringing and silent intervals of the two ring signals will distinguish between the two subscribers.

In two party divided operation, the telephone company applies a ringing signal to the ring conductor for one party and a ringing signal to the tip conductor for the other party. The ringing signal may be either a positive or a negative ringing signal. To employ the selective ringing circuit 10 in such two party divided operation, switches 34 and 38 are both closed for the party responding to ringing signals on the ring conductor, and switches 36 and 40 are both closed for the party responding to ringing signals on the tip conductor. With the closure of the two switches, the selective ringing circuit 10 responds in exactly the same way as has been previously described in conjunction with the closure of only one switch, except that the circuit 10 will activate in response to either a positive or a negative ringing signal on the selected conductor.

Should a party line or a private line subscriber wish to totally disable the telephone equipment from ringing, but not otherwise adversely influence operation of the equipment, all of the switches 34, 36, 38 and 40 can be opened. In such a situation, any ringing signal is rectified by the bridge 22, and the ringing circuit of the telephone equipment is rendered non-responsive to the rectified signal applied thereto.

The selective ringing circuit 10 also includes an automatic number identification means which can be selectively activated by closing switches 56, 58 and 60. The automatic number identification means is used in two party divided operation for automatically identifying the second party for long distance billing purposes. The second party is automatically identified by connecting a 2600 ohm or other ground resistor on the line so that the telephone company central office can discern that the second party is making the call as a result of a modified current flow through the line.

When the second party or subscriber goes "off hook" a negative voltage is applied on the tip extension conductor 12′ and at conductor 28. A greater negative voltage is present on the ring conductor 14, and the contacts in the telephone set make an electrical series connection through a conventional dial and speech circuit of the telephone equipment. A transistor 62 is biased into conduction as a result of its base terminal being connected to this source of negative voltage through diodes 64 and 66 and the voltage dividing biasing network provided by resistors 68 and 70. Current flows from the collector terminal of the transistor 62 through a resistor 72 and a ring dropping resistor 74 and a tip dropping resistor 76 to the tip and ring conductors, respectively. The resistors 72, 74 and 76 and the forward conduction resistance of the transistor 62 combine to form a 2600 ohm ground across the line. The resistance connected to the tip conductor is through the transistor 62, resistor 72 and resistor 76. The resistance connected to the ring connector is through the transistor 62, resistor 72 and resistor 74. These two resistances are essentially in parallel between ground and the tip and ring conductors. The tip and ring conductors are essentially connected in parallel through the closed off-hook contacts (except for the resistance of the dial and speech circuit). The component values of the resistances 72, 74 and 76 primarily combine to create the 2600 ohm resistance to ground. The conductive effect of the bridge rectifier 22 does not change the electrically parallel resistive effect of resistors 74 and 76 in achieving the 2600 ohm ground resistance.

The biasing circuit elements connected to the base terminal of the transistor 62 create an unbalanced resistance condition on the telephone line. To compensate for the unbalanced line condition, an equalizing shunt is placed across one of the ring and tip dropping resistors 74 and 76 respectively. When the central telephone office line is "straight" (ring conductor is negative, tip conductor is at ground), a shunt resistance is established by resistors 78, 80 and 82 and diode 84, and this shunt resistance is connected in parallel with the ring dropping resistor 74, as a result of the forward conduction of the diode 84. Diode 86 is reversed biased and therefore nonconductive. This added resistance shunts the ring dropping resistor 74 and creates a resistive effect equal to the resistance of the biasing circuit (resistors 68 and 70, and diodes 64, 66 and 90) which is connected between the tip conductor and ground. A shunt resistance equal to that of the biasing circuit is effectively connected to the opposite conductor from which the biasing circuit is connected. When the central office reverses the line (tip conductor is negative, ring conductor is at ground), the biasing circuit is connected to the ring conductor through the bridge rectifier 22. The diode 86 conducts thereby placing the shunt resistors 78, 80 and 88 and diode 86 in parallel with the tip dropping resistor 76. The shunt resistance to the tip conductor balances the effects of the biasing network on the ring conductor. A line with a 2600 ohm ground is therefore presented to the central office whether or not the line is straight or reversed. The shunting effect is created automatically to maintain a balanced line and avoid hum or other deleterious effects on telephone performance.

In the biasing circuit for the transistor 62, a diode 90 is connected between the base and emitter terminals to guard the base terminal against damaging reverse bias transients. Diode 64 prevents reverse currents through the base terminal and resistor 68 to ground. Diode 66 also blocks a positive ringing signal and test desk voltages. Test desk voltages are positive and applied to test telephone lines for trouble conditions. Diodes 92 and 94 prevent a short circuit between the tip and ring conductors through the ring dropping resistor 74 and tip dropping resistor 76.

As has been described above, the selective ringing circuit of the present invention presents substantial advantages and improvements. Only the selected ringing signal will be effective to ring the subscriber's telephone set or equipment. All other ringing signals will be rejected so that the subscriber's telephone equipment will not ring in response to ringing signals meant for or addressed to other subscribers on the same party line. The selective ringing circuit also provides the capability for the central telephone office to recognize the second party on a two party divided line by inserting the required resistance on the line when the second party places a long distance telephone call. The rectifying effect of the bridge 22 allows consistent polarity signals to be applied to the telephone equipment, thereby allowing key pads and other communication devices to be used without modification to the equipment. The selective ringing circuit is electrically powered by energy supplied over the telephone conductors. No separate power source is required. The direct connection of the tip and ring connectors through the selective ringing circuit when the circuit is activated, assures no adverse influence or modification to the normal telephone signals, and creates no significant impedance on the telephone system when in use. The bridge does not influence the DC current paths during normal telephone equipment operation. The selective ringing circuit is fully compatible for use in all types of telephone systems and in party line operating situations. Virtually any type of telephone equipment can be used in conjunction with the selective ringing circuit because of the direct electrical connection therethrough when activated and the lack of any adverse influence on the telephone system signals whether activated or inactivated. The selective ringing circuit will provide adequate and reliable performance under adverse station ground and long loop conditions. One selective ringing circuit can be utilized to achieve all of the foregoing advantages. No excessive inventory of different types of selective ringing circuits is required. Individualized operation is secured by operating switches on the selective ringing circuit.

A presently preferred embodiment of the present invention has been described above with a degree of specificity. The invention itself, however, is defined by the scope of the appended claims.

The invention claimed is:

1. A selective ringing circuit for ringing telephone equipment connected to a telephone line upon receipt of a predetermined one of plurality of AC ringing siganls and for preventing ringing of the telephone equipment upon receipt of any of the other AC ringing signals, the telephone equipment ringing only in response to an AC ringing signal applied thereto, said selective ringing circit comprising in combination;
    rectifier means connected to the telephone line for rectifying each of the AC ringing signals to a DC signal;
    selectively activated connection means electrically connected to the telephone line and to the telephone equipment and to said rectifier means for selectively supplying the DC signal to the telephone equipment when not activated and for selectively bypassing said rectifier means and directly electrically connecting the AC ringing signal to the telephone equipment when activated; and
    ringing signal detector means connected to the telephone lines and responsive only to the predetermined ringing signal for activating the connection means upon receipt of the predetermined ringing signal, the ringing signal detector means including selector means for selecting the predetermined one of the plurality of ringing signals in response to which to activate said connection means.

2. A selective ringing circuit as defined in claim 1 wherein the telephone line includes a ring conductor and a tip conductor, and wherein:
    the ringing signal detector means further comprises:
        one switch electrically connected to the ring conductor,
        an other switch electrically connected to the tip conductor, and
        conductive means electrically connected to the one and to the other switches for deriving an activation signal from a portion of the AC ringing signal present on the conductor to which one of said switches is connected and closed
    said connection means activating upon the receipt of the activation signal.

3. A selective ringing circuit as defined in claim 2 wherein the conductive means comprises a rectifier circuit for rectifying at least a portion of the AC ringing signal conducted by the closed switch and supplying the rectified portion of the AC ringing signal as a rectified DC signal, the conduction means supplying the rectified DC signal as the activation signal.

4. A selective ringing circuit as defined in claim 3 wherein:.
    said conductive means further comprises a filter capacitor means connected to the rectifier circuit to receive the rectified DC signal; and
    said connection means comprises relay means operative in response to the application of the activation signal to activate by moving electrical switching contacts for bypassing the rectifier means and establishing the direct electrical connection, said relay means including a relay coil electrically connected to the filter capacitor for receipt of the rectified DC signal.

5. A selective ringing circuit as defined in claim 1 wherein the telephone line includes a conductor to which one of a positive voltage offset AC ringing signal or a negative voltage offset AC ringing signal is selectively applied, and wherein:
    the ringing signal detector means further comprises:
        one switch electrically connected to the conductor,
        an other switch connected to the same conductor to which the one switch is connected,
        first poled conductive means electrically connected to the one switch for deriving an activation signal from a portion of the negative voltage offset ringing signal when the one switch is closed, and
        second poled conductive means electrically connected to the other switch for deriving an activation signal from a portion of the positive voltage offset ringing signal when the other switch is closed; and
    said connection means becoming activated upon receipt of the activation signal.

6. A selective ringing circuit as defined in claim 5 wherein the conductive means comprise a rectifier circuit for rectifying at least a portion of the AC ringing signal conducted by the closed switch and supplying the rectified portion of the AC ringing signal as a rectified DC signal, the conductive means supplying the rectified DC signal as the activation signal.

7. A selective ringing circuit as defined in claim 6 wherein:

said conductive means further comprises a filter capacitor means connected to the rectifier circuit to receive the rectified DC signal; and said connection means comprises relay means operative in response to the application of the activation signal to activate by moving electrical switching contacts for bypassing the rectifier means and establishing the direct electrical connection, said relay means including a relay coil electrically connected to the filter capacitor for receipt of the rectified DC signal.

8. A selective ringing circuit as defined in claim 1 wherein the telephone line includes a ring conductor and a tip conductor and the AC ringing signals applied to each conductor include a positive voltage offset AC ringing signal and a negative voltage offset AC ringing signal, and wherein:

said ringing signal detector means further comprises:
a first switch connected to the ring conductor,
a second switch connected to the tip conductor,
a third switch connected to the ring conductor,
a fourth switch connected to the tip conductor,
first poled conductive means electrically connected to the first and second switches to conduct signals from the ring and tip conductors respectively when the first or the second switch is closed, the first poled conductive means conducting only a portion of a negative voltage offset AC ringing signal and blocking conduction of any portion of the positive voltage offset AC ringing signal,
second poled conductive means electrically connected to the third and fourth switches to conduct signals from the ring and tip conductors respectively when the third or the fourth switch is closed, the second poled conductive means conducting only a portion of the positive voltage offset AC ringing signal and blocking conduction of any portion of the negative voltage offset AC ringing signal, and
detector rectifying means connected to receive the conductive portions of the AC ringing signals conducted by the first and second poled conductive means and operative for rectifying the conductive portions of said AC ringing signals and supplying the rectified portions of the AC ringing signal as an activation signal; and
said selective connection means activating upon the receipt of the activation signal.

9. A selective ringing circuit as defined in claim 8: further comprising a filter capacitor means connected to the detector rectifying means to receive the rectified conductive portions of the AC ringing signal; and said connection means comprises relay means operative in response to the application of the activation signal to activate by moving electrical switching contacts for bypassing the rectifier means and establishing the direct electrical connection, said relay means including a relay coil electrically connected to the filter capacitor for receipt of the rectified conductive portions of the AC ringing signal.

10. A selective ringing circuit as defined in claim 9 wherein:

each of the poled conductive means comprises a voltage sensitive breakdown device which conducts current there-through once the voltage across the breakdown device exceeds a predetermined breakdown voltage, and the predetermined breakdown voltage of each breakdown device exceeds the offset voltage of each AC ringing signal.

11. A selective ringing circuit as defined in claim 10 wherein each voltage sensitive breakdown device is a Zener diode.

12. A selective ringing circuit as defined in claim 1 wherein the telephone line includes a ring conductor and a tip conductor and the selective ringing circuit further comprises an automatic number identification means for selectively connecting a predetermined ground resistance to the telephone line in response to an off hook condition by a predetermined subscriber on the telephone party line, said automatic number identification means comprising:

a voltage activated current switching means electrically connected to supply current from ground potential to the ring and tip conductors,
a ring dropping resistor electrically connected between the current switching means and the ring conductor;
a tip dropping resistor electrically connected between the current switching means and the tip conductor; and
biasing means electrically connected to the rectifier means and operative for rendering the current switching means conductive in response to a voltage appearing as a result of the off hook condition;
the values of the ring and tip dropping resistors effectively establishing the predetermined ground resistance to the telephone line.

13. A selective ringing circuit as defined in claim 12 further comprising:

shunt resistive means electrically connected in parallel with each of the ring and tip dropping resistors, said shunt resistive means including a one way current conductive means for effectively connecting the shunt resistive means in parallel with the one of the ring or tip dropping resistors upon conduction of the current switching means, the shunt resistive means operatively compensating for the resistive effects of the biasing means connected to one of the tip or ring conductors; and wherein:
said rectifier means operatively connects the biasing means to one of the tip or ring conductors;
said shunt resistive means is operatively connected to the one of the tip or ring conductors to which the biasing means is not connected; and
the resistive effect of the shunt resistive means connected to one conductor is approximately equal to the resistive effect of the biasing means connected to the other conductor.

14. A selective ringing circuit for ringing telephone equipment connected to a telephone line upon receipt of a predetermined one of plurality of AC ringing signals and for preventing ringing of the telephone equipment upon receipt of any of the other AC ringing signals, the telephone equipment ringing only in response to an AC ringing signal applied thereto, said selective ringing circuit comprising in combination:

rectifier means connected to the telephone line for rectifying each of the AC ringing signals to a DC signal;
selectively activated connection means electrically connected to the telephone line and to the telephone equipment and to said rectifier means for selectively supplying the DC signal to the telephone equipment when not activated and for selectively bypassing said rectifier means and directly electrically connecting the AC ringing signal to the telephone equipment when activated; and ringing signal detector means connected to the telephone line and responsive only to the predetermined ringing signal for activating the connection means upon receipt of the predetermined ringing signal, the ringing signal detector means including selector means for selecting the predetermined one of the plurality of ringing signals in response to which to activate said connection means, and wherein:

said rectifier means supplies a consistent polarity DC signal in response to any one of the AC ringing signals applied the telephone line, and the telephone equipment receives the consistent polarity DC signal from the rectifier means when said connection means is not activated.

15. In a circuit for connection to a telephone party line having a ring conductor and a tip conductor, an improved automatic number identification means for selectively connecting a predetermined ground resistance to at least one of the tip and ring conductors in response to an off hook condition by a predetermined subscriber on the telephone party line, the improved automatic number identification means comprising:

rectifier means electrically connected to the tip and ring conductors and operative for rectifying signals on the telephone line during number identification to a consistent polarity DC voltage signal, current switching means electrically connected to supply current from ground potential to at least one of the ring and tip conductors, a ring dropping resistance electrically connected to conduct the current supplied by the current switching means to the ring conductor;

a tip dropping resistance electrically connected to conduct the current supplied by the current switching means to the tip conductor; and biasing means electrically connected to the rectifier means and operative for rendering the current switching means conductive in response to the DC voltage signal occurring as a result of the off hook condition;

the values of the ring and tip dropping resistances effectively establishing the predetermined ground resistance to the telephone line.

16. An improved automatic number identification means as defined in claim 15 further comprising:

shunt resistive means electrically connected in parallel with each of the ring and tip dropping resistances, said shunt resistive means including a one way current conduction means for effectively connecting the shunt resistive means in parallel with one of the ring or tip dropping resistances upon conduction of the current switching means, the shunt resistive means operatively compensating for the resistive effects of the biasing means connected to one of the tip or ring conductors; and wherein:

said rectifier means electrically connects the biasing means to one of the tip or ring conductors;

said shunt resistive means is electrically connected to the one of the tip or ring conductors to which the biasing means is not connected; and the resistive effect of the shunt resistive means connected to one conductor is approximately equal to the resistive effect of the one of the ring or tip dropping resistances connected to the other conductor.

17. A circuit for selectively supplying a consistent polarity DC signal to telephone equipment connected to a telephone line except in response to a predetermined AC ringing signal in which case the AC ringing signal is supplied for ringing the telephone equipment, the telephone equipment ringing only in response to an AC ringing signal applied thereto, said circuit comprising:

rectifier means connected to the telephone line for rectifying signals on the telephone line to the DC signal of consistent polarity;

selectively activated connection means electrically connected to a telephone line and the rectifier means and the telephone equipment and operative for supplying the DC signal to the telephone equipment when not activated and for selectively bypassing said rectifier means and connecting the telephone line to the telephone equipment when activated; and means electrically connected to the telephone line and responsive only to the predetermined ringing signal for activating said connection means, and including switch means for selectively preventing activation of said connection means 18. In a circuit for connection to a telephone party line having a ring conductor and a tip conductor, an improved automatic number identification means for selectively connecting a predetermined ground resistance to the telephone line in response to an off hook condition by a predetermined subscriber on the telephone party line, the improved automatic number identification means comprising:

rectifier means electrically connected to the tip and ring conductors and operative for rectifying signals on the telephone line during number identification to a consistent polarity DC voltage signal, current switching means electrically connected to supply current from ground potential to one of the tip or ring conductors;

a dropping resistance electrically connected to conduct the current supplied by the current switching means to the one conductor; and biasing means electrically connected to the rectifier means and operative for rendering the current switching means conductive in response to the DC voltage signal from the rectifier means occurring as a result of the off hook condition;

the connection of the dropping resistance to the one conductor contributing to the establishment of the predetermined ground resistance to the telephone line.

19. An improved automatic number identification means as defined in claim 18 further comprising:

shunt resistive means which becomes electrically connected from ground potential to the other one of the tip and ring conductors upon the current switching means becoming conducting, the shunt resistive means also effectively contributing to the establishment of the predetermined ground resistance to the telephone line.

20. An improved automatic number identification means as defined in claim 15, further comprising:

switch means for selectively electrically connecting each of said ring dropping and tip dropping resistances to the ring and tip conductors, respectively.

21. An improved automatic number identification means as defined in claim 19, further comprising:
   means including a diode for electrically connecting the shunt resistive means to the other one of the tip and ring conductors.

22. An improved automatic number identification means as defined in claim 21, further comprising:
   switch means for selectively electrically connecting said dropping resistance to a selected one of the conductors.

23. An improved automatic number identification means as defined in claim 18, further comprising:
   switch means for selectively electrically connecting said dropping resistance to a selected one of the conductors.

24. In a circuit for connection to a telephone party line having a ring conductor and a tip conductor, an improved automatic number identification means for selectively connecting a predetermined ground resistance to the telephone line in response to an off hook condition by a predetermined subscriber on the telephone party line, the improved automatic number identification means comprising:
   voltage activated current switching means electrically connected to supply current from ground potential to one of the tip or ring conductors;
   a dropping resistance electrically connected between the current switching means and the one conductor;
   biasing means electrically connected to the one conductor and operative for rendering the current switching means conductive in response to a voltage on the one conductor appearing as a result of the off hook condition;
   the connection of the dropping resistance to the one conductor contributing to the establishment of the predetermined ground resistance to the telephone line; and
   shunt resistive means which becomes electrically connected from ground potential to the other one of the tip and ring conductors upon the current switching means becoming conductive, the shunt resistive means also effectively contributing to the establishment of the predetermined ground resistance to the telephone line.

25. An improved automatic number identification means as defined in claim 24, further comprising:
   means including a diode for electrically connecting the shunt resistive means to the other one of the tip and ring conductors.

26. An improved automatic number identification means as defined in claim 18 wherein:
   said rectifier means also rectifies signals on the telephone line during normal telephone conversation operational conditions to supply the consistent polarity DC voltage signal during normal telephone conversation operational conditions, and
   said biasing means also renders the current switching means conductive in response to the DC voltage signal from the rectifier means occurring during normal telephone conversation operational conditions.

27. An improved automatic number identification means as defined in claim 26, further comprising:
   switch means for selectively electrically connecting and disconnecting said dropping resistance to a selected one or both of the conductors.

* * * * *